United States Patent
Wetzig

(10) Patent No.: US 8,176,770 B2
(45) Date of Patent: May 15, 2012

(54) SNIFFER LEAK DETECTOR

(75) Inventor: Daniel Wetzig, Cologne (DE)

(73) Assignee: Inficon GmbH (DE)

( * ) Notice: Subject to any disclaimer, the term of this patent is extended or adjusted under 35 U.S.C. 154(b) by 314 days.

(21) Appl. No.: 12/312,560

(22) PCT Filed: Oct. 26, 2007

(86) PCT No.: PCT/EP2007/061531
§ 371 (c)(1),
(2), (4) Date: May 15, 2009

(87) PCT Pub. No.: WO2008/064964
PCT Pub. Date: Jun. 5, 2008

(65) Prior Publication Data
US 2009/0277250 A1    Nov. 12, 2009

(30) Foreign Application Priority Data

Nov. 29, 2006   (DE) .................. 10 2006 056 215

(51) Int. Cl.
*G01M 3/16* (2006.01)
(52) U.S. Cl. ........................ 73/40.7; 73/23.42
(58) Field of Classification Search ............ 73/23.24, 73/23, 27, 42, 40.7
See application file for complete search history.

(56) References Cited

U.S. PATENT DOCUMENTS

| | | | |
|---|---|---|---|
| 3,968,675 A | 7/1976 | Briggs | 73/1 G |
| 4,018,241 A * | 4/1977 | Sodal et al. | 137/14 |
| 4,294,106 A | 10/1981 | Gevaud et al. | 73/40.7 |
| 4,785,666 A * | 11/1988 | Bergquist | 73/40.7 |
| 4,799,512 A * | 1/1989 | Sarson | 137/614.04 |
| 5,341,671 A | 8/1994 | Baret et al. | 73/40.7 |
| 6,415,650 B1 | 7/2002 | Bohm et al. | 73/40.7 |
| 2005/0183491 A1 * | 8/2005 | Tiwet et al. | 73/23.24 |

FOREIGN PATENT DOCUMENTS

| | | |
|---|---|---|
| DE | 3616319 | 7/1987 |
| DE | 19735250 | 2/1999 |
| DE | 19846798 | 4/2000 |
| EP | 0070341 | 1/1983 |
| EP | 0534825 | 3/1993 |
| GB | 1489953 | 8/1975 |
| WO | WO95/17655 | 6/1995 |
| WO | WO00/22400 | 4/2000 |
| WO | WO2006/120122 | 11/2006 |

* cited by examiner

*Primary Examiner* — Hezron E Williams
*Assistant Examiner* — Paul West
(74) *Attorney, Agent, or Firm* — Ohlandt, Greeley, Ruggiero & Perle, LLP

(57) ABSTRACT

A sniffing leak detector which comprises a mass spectrometer, a turbomolecular pump and a forevacuum pump. In case that the sniffing hose with the hand-operated sniffing probe becomes detached from the main device, atmospheric pressure would pass into the gas inlet conduit and disrupt the high vacuum in the mass spectrometer. In order to protect the mass spectrometer and the vacuum pump apparatus, a flow restrictor with an upstream filter is arranged in the gas inlet conduit.

16 Claims, 1 Drawing Sheet

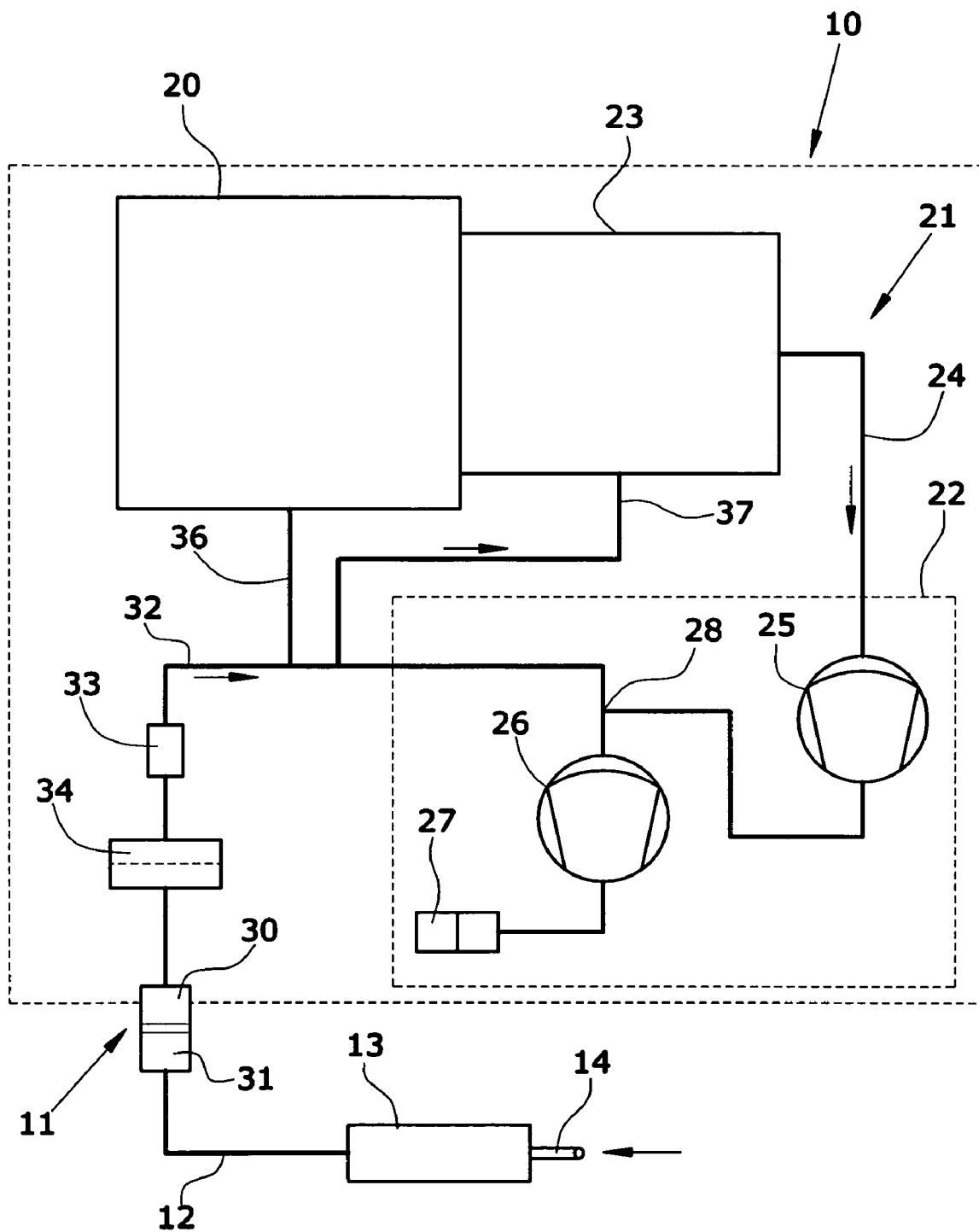

SNIFFER LEAK DETECTOR

BACKGROUND

1. Field of the Invention

The disclosure relates to a sniffing leak detector comprising a main device including a vacuum pump apparatus generating a high vacuum, and a gas detector, and a hand-operated sniffing probe connected to a gas inlet conduit of the main device via a flexible sniffing hose, and a detachable hose coupling.

2. Discussion of the Background Art

In leak detectors of the type designed for sniffing operation, the gas taken up by the sniffing probe is conveyed via a sniffing line to the main device. Within the main device, the concentration of the test gas in the sucked airflow is measured with the aid of gas detector, e.g. a mass spectrometer. For analysis, only a small portion of the gas is admitted into the high vacuum where the gas analysis is performed by means of the mass spectrometer. The bulk of the gas flow is pumped directly back into the atmosphere by a forevacuum pump. Normally, the forevacuum pump also generates the low fore pressure for the turbomolecular pump that generates the high vacuum for the mass spectrometer. For obtaining a sufficiently low fore pressure as well as a defined gas inflow into the high vacuum system, it is required to throttle the gas flow. This throttling is normally effected by the flow resistance of the sniffing line, which results in a pressure drop. Sniffing leak detectors are operative with a gas throughput between 20 sccm (standard cubic centimeters) and 300 sccm, depending on the type of the device. In case that, during operation, the sniffing line is detached from the main device, e.g. for replacing a clogged line by a new one, the pressure in the gas inlet conduit will increase to approximately 1000 mbar. This will cause a considerable pressure increase in the high vacuum region, which may lead to destruction of the gas detector or the vacuum pump apparatus. Thus, as result of a pressure increase, the emission filament of a mass spectrometer may be destroyed, with the consequence of total functional failure. Also by a pressure increase in the forevacuum system, a turbomolecular pump is subjected to a considerable stress because, with the sniffing line detached, the pump has to work beyond the admissible specification.

It is an object of the disclosure to provide a sniffing leak detector which is insensible to detachment of the sniffing hose from the main device in that the endangered components are protected from a too massive gas flow.

SUMMARY

The detector is characterized in that the gas inlet conduit includes a flow restrictor which in case of detachment of the hose coupling is operative to limit the gas flow passing through the gas inlet conduit.

In case of detachment of the hose coupling, the limitation of the gas flow will prevent that the gas detector and the vacuum pump apparatus are put at risk. The flow blocked in this manner is limited to the effect that the pressure rise in the high vacuum system will not endanger the emission filament of the mass spectrometer or other component reacting to excessive pressure. Also the vacuum pump apparatus which includes e.g. a turbomolecular pump, will not be overstrained. During normal operation of the sniffing leak detector, the flow restrictor does not have a disadvantageous effect. Preferably, the flow resistance of the flow restrictor is smaller than that of the sniffing hose so that the overall resistance is determined substantially by the flow resistance of the sniffing hose. Thus, in normal operation, the pressure drop at the flow restrictor is negligible. In the situation where the sniffing line is detached, the flow resistance of the flow restrictor should amount to at least a third of the flow resistance of the sniffing hose inclusive of the sniffing probe. Preferably, it should at least have the same value.

The flow restrictor can consist of a throttle or also of an apertured partition. An aperture has the effect that the flow is choked at a maximum value and cannot substantially exceed the maximum value.

The flow restrictor in the gas inlet conduit has the function to choke and thus to limit the flow when the sniffing line has been detached. The flow will be choked at an apertured partition with a pressure ratio of $p1/p2>2$. This is the case in the detached condition of the sniffing line.

When connecting the sniffing line, the pressure drop along the sniffing line will reduce the pressure at the inlet side of the aperture in such a manner that the choking effect is terminated and the flow conductance via the aperture can be neglected.

The way of functioning when using a throttle comprising a capillary with larger longitudinal dimension, is similar. A disadvantageous effect of the throttle is to be seen in that the blocking effect deteriorates with increasing length of the throttle capillary.

One can utilize a throttle as well as a plate-shaped apertured partition made of a thin metal sheet, the ideal case resulting in the use of the apertured partition.

An advantage of the disclosure is that the sniffing line can be changed without special measures, even during operation of the device. The sniffing leak detector can be run up also without the sniffing line connected. No valve will be required at the gas inlet. Switching off the device will go easy on the turbomolecular pump. Switch-off will also go easy on the components of the mass spectrometer, e.g. the emission filter.

Suitably, a filter is arranged in line with the flow restrictor. Thereby, ingress of contamination into the vacuum system is prevented.

BRIEF DESCRIPTION OF THE DRAWINGS

An embodiment of the disclosure will be explained in greater detail hereunder with reference to the sole FIGURE of the drawing.

In the drawing, the structural design of the sniffing leak detector is schematically shown.

DETAILED DESCRIPTION OF THE PREFERRED EMBODIMENT

The sniffing leak detector comprises a main device 10 configured as a floor-supported device and accommodating the heavy components. Connected to said main device 10 via a hose coupling 11 is a flexible sniffing hose 12 provided with a hand-operated sniffing probe 13. Said sniffing probe 13 is operative to suck gas from the atmosphere via an inlet 14, which gas has to be tested for traces of the test gas, e.g. helium.

Main device 10 includes a gas detector 20 which in the present embodiment is a mass spectrometer. For the function of the mass spectrometer, a high vacuum is required which is generated by the vacuum pump device 21. The high vacuum is defined in that the pressure is $p<1.3\times10^{-3}$ mbar. The high vacuum region consists of an interior space of mass spectrometer 20.

Vacuum pump device 21 includes a forevacuum pump 22 and a turbomolecular pump 23 having its vacuum side connected directly to the housing of mass spectrometer 20.

The outlet of turbomolecular pump 23 is connected, via a fore pressure line 24, to the inlet of forevacuum pump 22. In the present embodiment, the forevacuum pump is of the two-stage type. The pump comprises a first pump stage 25 and a forepump stage 26 which are connected in series. Said forepump 26 is operative to pump into an outlet 27 leading to the atmosphere.

Hose coupling 11 comprises a plug socket 30 provided on the housing of main device 10 and arranged to receive a plug member 31 of sniffing line 12. The plug socket 30 is connected to a gas inlet conduit 32 including the flow restrictor 33 and a filter 34. Said filter 34 is located between hose coupling 11 and flow restrictor 33. In the present embodiment, flow restrictor 33 is formed as an aperture.

Downstream of flow restrictor 33, gas inlet conduit 32 is connected to the high-vacuum inlet 36 of gas detector 20. Gas inlet conduit 32 is further connected to an intermediate gas inlet 37 of turbomolecular pump 23. Finally, gas inlet conduit 32 is connected to the connection point 28 of the two pump stages of forevacuum pump 22.

In a practical application, the flow restrictor was integrated into the Ecotec E3000 apparatus of INFICON GmbH. The standard flow during normal operation with sniffing hose 12 is 160 sccm. When detaching the sniffing hose, the flow without protective measures would increase to several thousand sccm. The large gas flow would cause a massive increase of the pressure in the system. For this reason, the flow restrictor 33 was employed. The latter consisted of an aperture having a hole diameter of 0.26 mm. Thereby, the flow with detached sniffing hose was throttled to about 600 sccm. Both in the high vacuum system with $p<1.3\times10^{-3}$ mbar and in the forevacuum system ($p<10$ mbar) towards the turbomolecular pump, the pressure with detached sniffing hose remained in the allowable range. During normal operation, the aperture will reduce the flow only by less than 10% in comparison to the condition without aperture.

What is claimed is:

1. A sniffing leak detector, comprising:
a main device including a vacuum pump apparatus generating a high vacuum,
a gas detector,
a hand-operated sniffing probe connected to a gas inlet conduit of the main device via a flexible sniffing hose, and
a detachable hose coupling, wherein the gas inlet conduit includes a flow restrictor which in case of detachment of the hose coupling is automatically operative to limit the gas flow passing through the gas inlet conduit without completely stopping the gas flow.

2. The sniffing leak detector according to claim 1, further comprising a filter arranged in series with the flow restrictor.

3. The sniffing leak detector according to claim 1, wherein the hose coupling is a plug-type coupling comprised of a plug socket and a plug member.

4. The sniffing leak detector according to claim 1, wherein the flow restrictor is dimensioned in such a manner that, when the sniffing hose is detached, a pressure drop is generated at the flow restrictor for limiting the pressure in the high vacuum region to a value which is not harmful to the gas detector and the vacuum pump apparatus.

5. The sniffing leak detector according to claim 1, wherein the vacuum pump apparatus includes a forevacuum pump and a turbomolecular pump.

6. The sniffing leak detector according to claim 5, wherein the turbomolecular pump comprises an intermediate gas inlet connected to the gas inlet conduit.

7. The sniffing leak detector according to claim 5, wherein the forevacuum pump comprises two pump stages, their connection point being connected to the gas inlet conduit.

8. The sniffing leak detector according to claim 1, wherein the flow restrictor is an apertured partition having a flow resistance smaller than 10% of the flow resistance of the sniffing hose.

9. The sniffing leak detector according to claim 1, wherein the flow restrictor is a throttle.

10. A sniffing leak detector, comprising:
a main device including a vacuum pump apparatus generating a high vacuum,
a gas detector,
a hand-operated sniffing probe connected to a gas inlet conduit of the main device via a flexible sniffing hose, and
a detachable hose coupling, wherein the gas inlet conduit includes a flow restrictor which in case of detachment of the hose coupling, during operation of the vacuum pump apparatus, is operative to automatically limit the gas flow passing through the gas inlet conduit without completely stopping the gas flow.

11. The sniffing leak detector according to claim 10, further comprising a filter arranged in series with the flow restrictor.

12. The sniffing leak detector according to claim 10, wherein the vacuum pump apparatus includes a forevacuum pump and a turbomolecular pump.

13. The sniffing leak detector according to claim 12, wherein the turbomolecular pump comprises an intermediate gas inlet connected to the gas inlet conduit.

14. The sniffing leak detector according to claim 12, wherein the forevacuum pump comprises two pump stages, their connection point being connected to the gas inlet conduit.

15. The sniffing leak detector according to claim 10, wherein the flow restrictor is an apertured partition having a flow resistance smaller than 10% of the flow resistance of the sniffing hose.

16. The sniffing leak detector according to claim 10, wherein the flow restrictor is a throttle.

* * * * *